Figure 3:
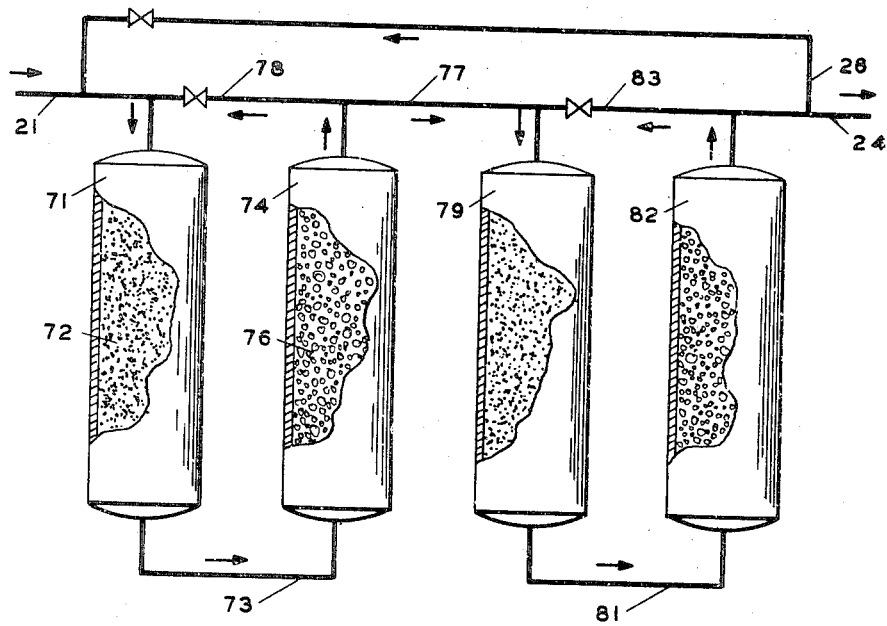

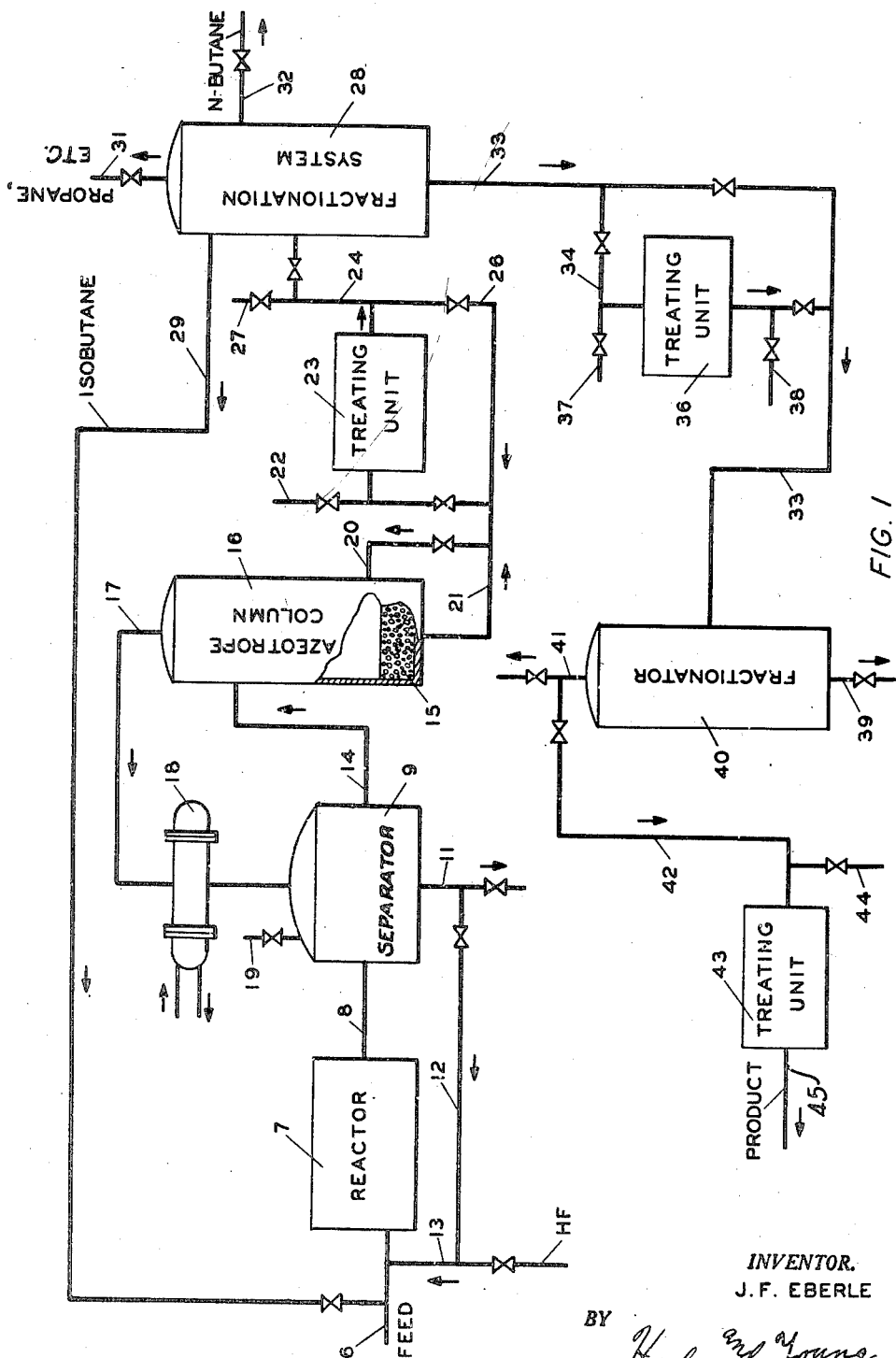

Patented Sept. 6, 1949

2,481,208

UNITED STATES PATENT OFFICE 2,481,208

METHOD OF DEHYDROFLUORINATION WITH METALLIC MIXTURES AS CATALYST

Jack F. Eberle, Bartlesville, Okla., assignor to Phillips Petroleum Company, a corporation of Delaware Application December 26, 1945, Serial No. 637,169

17 Claims. (Cl. 260—683.4)

This invention relates to the treatment of hydrocarbons. In one particular aspect, this invention relates to the removal of organically combined fluorine from a hydrocarbon effluent of an alkylation proceess using a fluorine-containing catalyst. More particularly, in this aspect this invention relates to the conversion of organic fluorine compounds to hydrogen fluoride and the corresponding hydrocarbon radical, and the recovery of hydrogen fluoride thus liberated. In another aspect this invention relates to a new and improved defluorination catalyst.

This application is a continuation-in-part of my prior and copending application Serial No. 603,837, filed July 9, 1945.

In the manufacture of hydrocarbons by processes in which a fluorine-containing catalyst is used, small proportions of organic fluorine-containing by-products are formed. These processes may involve such reactions as polymerization, isomerization and alkylation of relatively low-boiling hydrocarbon to produce motor fuel having a high octane rating, and more effected in the presence of catalysts comprising one or more of such inorganic fluorine compounds as hydrofluoric acid, boron trifluoride and the like. Although the exact nature or composition of these organic fluorine-containing by-products has not been definitely established, they are believed to be predominantly alkyl fluorides and/or aryl fluorides. These fluorides are not completely removed by washing the hydrocarbon mixtures in which they are contained with alkaline solutions such as aqueous solutions of sodium hydroxide or sodium carbonate. For the most part, these organic fluorine compounds have boiling points which are not substantially higher than the several reactants used in the conversion process. However, some of the organic fluorine compounds do have higher boiling points than the reactants and the boiling points of the higher-boiling fluorides correspond to the boiling points of the conversion products. As a result, these organic fluorine compounds will be found in the various hydrocarbon fractions in subsequent separation processes for separating and refining the products, and in many instances the organic fluorine compounds tend to accumulate in the various high-boiling hydrocarbon fractions. These fluorides tend to decompose at elevated temperatures, such as those employed in fractional distillation of the hydrocarbon mixture, thereby forming hydrofluoric acid which is corrosive, especially in the presence of moisture. In gaseous mixtures of hydrocarbons they may thus cause corrosion of treating equipment; in liquid hydrocarbon mixtures, and especially motor fuels, they are undesirable for similar reasons that are obvious and because they reduce the antiknock value of the fuel.

Consequently, it is highly desirable and often essential to minimize the accumulation of the organic fluorine compounds, or to remove them from the hydrocarbon effluent of such processes as described. Various methods have been used to remove the organic fluorine compounds from the hydrocarbon effluent. For example, in the alkylation of low-boiling paraffins in the presence of a hydrofluoric acid alkylation catalyst the alkylation effluent is passed to a separator wherein a liquid hydrocarbon-rich phase and a liquid hydrogen fluoride-rich phase are formed. The liquid hydrocarbon-rich phase is passed from the separator to a distillation column wherein dissolved hydrogen fluoride is removed as an overhead azeotropic mixture with light hydrocarbons. The bottom fraction contains the alkylate product and also minor proportions of organic fluorine compounds which are undesirable as previously mentioned. In the usual practice the bottom fraction from this distillation is treated to remove the organic fluorine compounds. Such treatments comprise contacting the bottom fraction with a suitable sorption material which selectively sorbs the organic fluorine compounds, or contacting the bottom fraction with a catalytic dehydrofluorination agent which converts the organic fluorine compound to hydrogen fluoride and the corresponding organic radical. Sorption materials which have been used to sorb organic fluorine compounds include those known to be catalytically active for hydrogenation and dehydrogenation reactions, such as activated alumina or bauxite. Catalytic dehydrofluorination agents which are suitable for converting the organic fluorine compounds include various fluorides of metals and compounds resulting from treatment of oxides of various metals with hydrogen fluoride. Various other treatments which involve the use of catalytic agents have been used in removing the organic fluorine compounds rendering the hydrocarbon fraction substantially non-corrosive.

In all these treatments it is very difficult, if not impossible, to remove absolutely or even substantially all of the organic fluorine compounds, because in the case of sorbents the sorption power decreases and in the case of catalysts the equilibrium of the decomposition reaction must be considered. Due to the presence of some of the fluorine compounds, especially the high-boiling organic fluorine compounds, remaining in the hydrocarbon fraction, the hydrocarbon stream becomes corrosive as a result of the accumulation of the organic fluorine compounds in the bottom fractions from various fractional distillations subsequent to the conventional organic fluorine compound-removal process. Therefore, it is much to be desired to provide a method for removing substantially all of the organic fluorine compounds from the hydrocarbon stream in order to prevent corrosion of subsequent equipment by concentration of the organic fluorine compounds in the bottom fractions in the various fractional distillations.

Moreover, since the fluorine combined as the organic fluoride represents, over a period of time, a substantial loss of hydrofluoric acid catalyst in a conversion process such as alkylation, the recovery of the fluorine as hydrogen fluoride would amount to a substantial saving in costs of operation and material.

An object of this invention is to effect substantially complete removal of fluorine compounds from mixtures containing the same.

Another object of this invention is to provide a new and improved defluorination catalyst.

A further object of this invention is to provide an improved process for obtaining a substantially fluorine-free alkylate from a process for the akylation of low-boiling hydrocarbons in the presence of a fluorine-containing alkylation catalyst.

Another object of this invention is to recover fluorine combined as organic fluorine compounds which are by-products of an alkylation process as free hydrogen fluoride to be recycled to the alkylation process as a catalyst therefor.

Still another object of this invention is to remove dissolved hydrogen fluoride from a hydrocarbon mixture containing the same.

It is a further object of this invention to increase the efficiency of a dehydrofluorination catalyst for the removal of organic fluorine compounds from a hydrocarbon effluent of a hydrocarbon conversion process.

Another object of this invention is to decompose organic fluorine compounds to liberate hydrogen fluoride and the corresponding organic radical.

Other objects and advantages of this invention will become apparent to those skilled in the art from the accompanying disclosure and description.

In accordance with this invention, fluorine compounds can be substantially removed from a fluid mixture containing the same by contacting the fluid mixture with a suitable catalytic agent which decomposes the fluorine compound to liberate hydrogen fluoride and with a suitable sorption medium which is capable of sorbing the liberated hydrogen fluoride. In contacting an organic mixture containing an organic fluorine compound with a catalytic agent according to one embodiment of this invention, the organic fluorine compound is decomposed into hydrogen fluoride and the corresponding organic radical. The decomposition of the organic fluorine compound is an equilibrium reaction, as evidenced by the following typical reaction equation:

Alkyl fluoride ⇌ Olefin + HF

Once such an equilibrium is established in the presence of a catalyst no further decomposition of the organic fluorine compound takes place unless one of the products of decomposition is removed, such as the olefin or the hydrogen fluoride. If one or both of the decomposition products are removed, the decomposition reaction of the organic fluorine compound will proceed toward completion and thus decompose substantially all of the organic fluorine compound. Consequently, the organic mixture containing the organic fluorine compound is contacted either simultaneously or alternately with a catalytic defluorination agent and with a suitable sorption medium. The removal of the hydrogen fluoride by the sorption medium upsets the decomposition equilibrium and permits further catalytic decomposition of the organic fluorine compound.

Much to my surprise I have discovered a superior defluorination catalyst for use according to this invention to be a solid mixture of two or more elementary metals. The solid mixture of substances may be either a homogeneous mixture, such as a solid solution, or preferably, a non-homogeneous mixture. For example, the mixture may consist of solid pellets, pillules, granules, or various predetermined shapes and forms of two elementary metals, an elementary metal and a solid solution of two metals, two solid solutions of different compositions, or a solid solution. I have found in particular that twisting together two or more wires of different metals and plating one metal with another metal assure excellent results according to this invention. Welding, forming, and molding the metals together in various shapes, such as helices, cubes, cylinders, spheres, cones, etc., are useful methods of forming the catalyst.

As the metals comprising the solid mixture, I prefer to use those metals classed as heavy metals according to the periodic table in General Chemistry; Deming, H. G.; 4th ed.; John Wiley & Sons. In particular, I prefer a polymetallic mixture of two or more metals selected from the groups I—B, II—B, III—A, IV—A, VI—B, VII—B, and VIII of the above periodic table.

Solid mixtures of two or more metals may comprise, for example, a non-homogeneous mixture of finely divided copper and finely divided iron, shavings of Monel metal (a solid solution of nickel and copper), and such alloys as ferromolybdenum, ferromanganese, and ferrochrome. Suitable catalytic mixtures may consist of two or more of the following metals; aluminum, magnesium, nickel, zinc, tin, iron, copper, chromium, molybdenum, and manganese. The above mixtures are much superior to a catalyst consisting of any one of the individual components of the mixture.

In the preferred embodiment of the present invention, an organic mixture containing an organic fluorine compound is passed, in either the liquid or vapor phase, through a treating zone containing both a powdered or a granular catalytic defluorination mixture and a hydrogen fluoride-sorption medium. This treating zone is usually arranged in such a manner that the catalyst and the sorption medium are in alternate layers. By such an arrangement the first catalytic layer establishes a decomposition equilibrium reaction and the subsequent sorption layer upsets this equilibrium by removing liberated hydrogen fluoride; then the next catalytic layer reestablishes the decomposition equilibrium by decomposing at least a portion of the remaining organic fluorine compound. Each following catalytic and sorption layer acts in a similar manner until substantially all of the organic fluorine compound is decomposed.

Another embodiment, which may also be practiced, is the arrangement of the catalyst and sorption medium in successive zones rather than in a single zone; thus, the catalyst will be maintained in one separate zone or column and the sorption medium will be maintained in a second and successive zone or column, through which the organic mixture passes, respectively. Still another arrangement may be followed by supporting alternate layers of catalyst and sorption medium in a sorption column in such a manner that free space exists between the supported layers. This arrangement is especially desirable since the tendency for channelling of the liquid hydrocarbon stream through the powdered or granular contact material is minimized. The number of layers or zones which will be suitable for removal of the organic fluorine compound depends upon several factors such as the type of catalytic mixture, the type of sorption medium, the conditions of temperature and pressure, and the depth of the catalytic and sorption beds; but such conditions and the number of successive layers or zones may be easily determined by trial. In general, about 3 to about 6 inch depth layer of catalyst and of sorption material will be sufficient when from about 10 to about 25 layers are used in the treating zone.

In a somewhat less preferred embodiment of the present invention the catalyst and sorption medium may be admixed together in a treating zone in a more or less uniform manner and the organic mixture contacted with the uniform mixture of catalyst and sorption medium. The arrangement of alternate layers of separate zones for each contact material is preferred in order to facilitate recovery of the sorbed hydrogen fluoride, if desired, and also since the contact of liberated hydrogen fluoride with the polymetallic catalyst substantially decreases the catalytic activity thereof by the conversion of the hydrogen fluoride to the corresponding metallic fluoride. Such conversion to the metallic fluoride consumes both the catalyst and the hydrogen fluoride so as to decrease the activity of the catalyst and hinder the recovery of hydrogen fluoride.

In particular, an especially novel and preferred dehydrofluorination catalyst for carrying out this invention has been found to be copperplated iron in the form of filings, granules, beads, etc. Such iron granules or filings are treated with hydrochloric or sulfuric acid prior to plating, and are washed free of the acid. Thereafter, the iron filings are treated with copper sulfate under conditions appropriate to copperplate the iron and render the resulting catalyst particularly effective in accomplishing a quick decomposition reaction of the organic fluorine compound. Various other metals may be copperplated in a similar manner and rendered particularly active catalysts for decomposing organic fluorine compounds.

Other defluorination catalysts which may be employed in practicing the process of this invention, although not as desirable as the aforesaid novel catalyst mixture, can be prepared by treating various oxides of metals, such as aluminum, titanium, zirconium, hafnium, thorium, vanadium, chromium, molybdenum, tungsten, uranium, manganese, iron, cobalt, and nickel, with hydrogen fluoride or with a material which will release hydrogen fluoride under conditions used for treating the metal oxide. Of these a particularly good catalyst results from treating a more or less hydrous oxide of aluminum with hydrogen fluoride at a suitable temperature. The various naturally occurring oxides such as bauxite, limonite, manganite, baddeleyite, brookite, brucite, diaspore, dysanalite, gibbsite, goethite, hausmannite, huebnerite, ilmenite, lepidocrocite, rutile, spinel, valentinite, etc., may also be treated in a similar manner to produce a suitable defluorination catalyst. It is generally desirable when using the natural oxides to choose an oxide relatively free from substantial amounts of silica, although minor amounts are not deleterious. Fluorides of the metals of group II of the periodic table in combination with a fluoride of a metal of the calcium group generally known as the alkaline earth metals and including calcium, strontium, and barium are also active defluorination catalysts. Various other catalysts which are known to those skilled in the art for decomposing organic fluorine compounds may be used as the catalytic agent in practicing the particular process of the present invention without departing from the scope thereof.

Although many catalysts known in the art may be employed as the defluorination agent when practicing the process herein disclosed of contacting a fluid containing fluorine compounds alternately or simultaneously with a defluorination agent and with a hydrogen fluoride sorption material, the solid catalytic mixture of two or more elementary metals has been found much superior to any known catalyst and is particularly adaptable to the present process since it quickly establishes the decomposition equilibrium of the fluorine compounds.

Sorption materials which have been found suitable for selectively sorbing hydrogen fluoride from an organic mixture have been found to comprise charcoal, dehydrated bauxite, granular metal oxides such as alumina, chromium oxide, and dehydrated metal oxide gels and the like. Materials which are capable of sorbing hydrogen fluoride and which involve a chemical reaction to form a decomposable salt are especially desirable. Such sorbent materials may comprise fluorides of the alkali and alkali earth metals, such as sodium fluoride or potassium fluoride, which form the addition compound of the type $NaF \cdot HF$. If desired, the hydrogen fluoride may be recovered from the double salt by heating directly or by passing hot gases over the sorption medium. Nitrogen bases and metal salts that form acid fluorides are also suitable for sorption of the liberated hydrogen fluoride.

Obviously both the catalyst and sorption medium may be supported on various inert materials well known to those skilled in the art without departing from the scope of this invention.

In practicing the preferred embodiment of this invention for the removal of organic fluorine compounds from a predominantly hydrocarbon mixture, the temperature of the treating zone is from about 70 to about 400° F. or higher, preferably about 200 to about 300° F., and the pressure is from about 100 to about 600 pounds per square inch gage, preferably from about 200 to about 450 pounds per square inch gage. A suitable space velocity in liquid volumes of organic mixture per volume of catalyst per hour is from about 1 to about 10, and preferably from about 2 to about 3. As previously described, if the catalyst and sorption medium are arranged in layers, the thickness of the layers may be from about 3 to about 6 inches and the number of layers may be about 10 to about 25; the actual thickness and number of layers will depend upon the conditions of operation and upon the particular catalyst and sorption medium used. Such conditions set forth above are not limiting to the scope of this invention, but are those which have been found preferable in general for removing substantially all of the organic fluorine compounds from the hydrocarbon mixture without effecting extensive chemical changes in the hydrocarbons themselves. Various other conditions may be found appropriate by trial.

In the case where the catalystic agent and the sorption medium are in separate zones or columns somewhat different conditions of temperature, pressure, etc. may be used for each column during defluorination. Thus, relatively high temperatures and low pressures may be used in the catalyst zone, while relatively low temperatures and high pressures may be used in the sorption zone. However, due to economic reasons it may be more desirable to maintain substantially the same conditions in both the catalytic and sorption zones.

The sorbed hydrogen fluoride is recovered from the sorption medium and the sorption medium regenerated by direct heating or passing hot, substantially inert, gases such as air, steam, hydrocarbons, etc. through the treating zone. The heating process not only regenerates the sorption medium, but also may activate the catalytic defluorination agent when the sorption medium and catalytic agent are contained in the same zone. In case the sorption medium is an non-reactive material which sorbs the liberated hydrogen fluoride, such as charcoal, this material may be regenerated by passing superheated steam or other hot gases, such as butane, at a temperature from about 400 to about 800° F., preferably about 500 to 600° F., and at approximately atmospheric pressure through or in contact with the sorption medium. When a material, such as sodium or potassium fluoride which forms an additive compound with the liberated hydrogen fluoride, is used as the sorption medium, the temperature of the regenerating gas, such as air, steam, butane, etc., is from about 500 to about 1000° F., preferably from about 600 to about 700° F., and the pressure is approximately atmospheric. It may be preferred to operate the regeneration cycle at the same pressure as the sorption cycle, and thus the use of elevated pressure for regeneration are within the scope of this invention. Regeneration of the sorption medium may be accomplished also by heating the sorption medium directly without passing a hot gas through the medium. Upon heating the sorption medium during regeneration, whether by direct means or by the use of hot gases, vaporous hydrogen fluoride is liberated which may be recovered by methods familiar to those skilled in the art. In particular, when a regenerating gas, such as butane, is used, the hydrogen fluoride may be recovered from the resulting gaseous mixture by condensing the gaseous mixture and fractionally distilling the condensate to recover the hydrogen fluoride.

Although this invention can be applied with advantage in many modifications to the removal of either organic or inorganic fluorine compounds from both organic and inorganic fluid mixtures, particular benefits of it have been realized in connection with the alkylation of low-boiling isoparaffins with low-boiling olefins in the presence of a fluorine-containing alkylation catalyst. It is believed that the principles of this invention may be adequately illustrated by the discussion of a specific modification in connection with the accompanying Figures 1, 2 and 3 which form a part of this application, and which illustrate diagrammatically an arrangement of apparatus suitable for practicing this invention in connection with such an alkylation process.

Referring to Figure 1, a suitable alkylation reaction zone is diagrammatically represented by element 7. An alkylation feed, comprising an isoparaffin and an olefin, is charged to reactor 7 through line 6. Such a feed may comprise isobutane and a butane-butylene fraction or a butane-amylene fraction from a refinery. Typical examples of such olefin containing fractions are shown in the following table:

| Component | Liquid Volume Per Cent | | | | | |
|---|---|---|---|---|---|---|
| | A | B | C | D | E | F |
| Propane and Lighter | 0.8 | {8.1} | 0.2 | 0.5 | 0.6 | 0.7 |
| Isobutane | 9.6 | | 7.9 | 35.1 | 30.7 | 33.0 |
| Butylenes | 16.6 | 24.9 | 20.0 | 17.0 | 17.3 | 16.3 |
| Normal Butane | 22.4 | 28.2 | 22.7 | 34.4 | 37.9 | 35.6 |
| Amylenes | 13.7 | 13.9 | 15.0 | 4.8 | 5.0 | 4.6 |
| Pentanes | 36.5 | 24.8 | 33.9 | {8.2 | 8.5 | 9.8 |
| Heavier | 0.4 | 0.1 | 0.3 | | | |
| | 100.0 | 100.0 | 100.0 | 100.0 | 100.0 | 100.0 |

A hydrofluoric acid alkylation catalyst, such as liquid hydrogen fluoride, is introduced into line 13 and the feed and catalyst may pass either together or separately into reactor 7, as desired. Generally the temperature of alkylation will be about 80 to about 100° F. and sufficient pressure will exist in reactor 7 to maintain the reactants in liquid phase. A hydrocarbon to acid ratio between about 0.5:1 and about 2:1 is preferred to obtain the appropriate alkylation of the isoparaffin. The ratio of isoparaffin to olefin in the reaction zone itself will be much larger than the ratio of isoparaffin to olefin in the feed. The high ratio of isoparaffin to olefin is accomplished in part by recirculating a portion of the isoparaffin in the reaction zone; usually the ratio of isoparaffin to olefin in the reaction zone itself is 100:1 or higher.

From reactor 7 the resulting hydrocarbon alkylation effluent passes to separator 9 through line 8. In separator 9 a liquid hydrocarbon-rich phase is separated from a heavier liquid hydrogen fluoride-rich phase by gravity. The hydrogen fluoride-rich phase is withdrawn from separator 9 through line 11 and may be passed to a purification system (not shown) for removal of acid-soluble oils and water. After purification the hydrogen fluoride is returned to reactor 7 as a catalyst. If desired, all or a portion of the hydrogen fluoride-rich phase may be passed directly from separator 9 through lines 11, 12 and 13 to reactor 7. Make-up or fresh hydrogen fluoride is introduced into the system through line 13.

The hydrocarbon-rich phase from separator 9 contains some dissolved hydrogen fluoride and is therefore passed to an azeotropic distillation column 16 through line 14 to remove the hydrogen fluoride as an overhead product from the distillation zone. An azeotropic mixture of hydrogen fluoride and low-boiling hydrocarbons is removed from azeotrope column 16 through line 17 and passed through condenser 18 thence into separator 9 where it separates into a hydrocarbon-rich phase and a hydrogen fluoride-rich phase. The low-boiling hydrocarbons in the azeotropic mixture comprise propane, ethane, and some butanes. The bottom fraction from azeotrope column 16 comprises essentially unreacted isobutane, alkylate, some propane, and minor proportions of organically combined fluorine present as a by-product of the alkylation reaction. The organically combined fluorine comprises $C_4$ fluorides and lighter organic fluorides and lesser proportions of organic fluorine compounds heavier than $C_4$ fluorides.

According to one modification of this invention, a defluorination catalyst comprising a solid mixture of two or more elementary metals, for example copperplated iron filings, is present in the lower portion of azeotrope column 16, as shown by numeral 15. The liquid bottom product of the distillation containing the organic fluorine compounds contacts the defluorination catalyst 15 at the kettle temperature of the distillation under conditions such that the organic fluorine compounds are decomposed within column 16 itself to form hydrogen fluoride and the corresponding organic radical. The free hydrogen fluoride liberated in the lower portion of column 16 by the defluorination catalyst therein passes from column 16 with the vaporous overhead product through line 17. The liquid bottom fraction removed from column 16 through line 21 may be substantially free from organic fluorine compounds. A portion of this bottom fraction, when it still contains some organic fluorine compounds, may be recycled through line 20 to the lower portion of the azeotrope column 16 for further contact with the defluorination catalyst 15, if desired.

Defluorination catalyst 15 may be placed in any desired position in azeotrope column 16; however, to prevent extensive contact of free hydrogen fluoride with the catalyst and to obtain maximum temperature of contact, the catalyst is positioned in the lower portion of column 16, as shown.

In another modification, with or without the presence of defluorination catalyst 15 in azeotrope column 16, the bottom fraction is passed from azeotrope column 16 through line 21 to a treating unit 23 for removal of these organic fluorine compounds or a portion thereof. Treating unit 23 may comprise a single zone with alternate layers of an active defluorination catalyst and a selective sorption medium as previously discussed and shown in Figure 2. Treating unit 23, on the other hand, may also be a series of successive columns alternately containing an active defluorination catalyst and a sorption medium, as indicated in Figure 3. The quantity of organic fluorine in the bottom fraction from column 16, which passes to treating unit 23, is in general not more than about 0.1 per cent by weight of the hydrocarbon stream, and usually not more than about 0.001 to about 0.05 per cent, when no defluorination catalyst is present in azeotrope column 16.

Generally the operating conditions for removing the organic fluorine compounds in treating unit 23 by the process of this invention are such that the removal is effected in the liquid phase. However, vapor phase operation is within the scope of this invention. Liquid phase operation is preferred because lower temperatures of operation and smaller sized equipment may be used since the hydrocarbon stream is liquid. The use of pressures from about 200 to about 450 pounds per square inch gage and temperatures from about 200 to about 300° F. are preferred. Using these preferred pressures, a space velocity from about 2 to about 3 liquid volumes of hydrocarbon effluent per volume of catalyst per hour is adequate. Although various dehydrofluorination catalysts may be used in carrying out the process of this invention, a particularly novel catalyst, as previously described and which is preferred as the catalytic defluorination agent, comprises iron granules or filings which have been treated with concentrated sulfuric or hydrochloric acid and then subsequently copperplated with copper sulfate. This copperplated catalyst quickly brings about an equilibrium decomposition reaction of the organic fluorine compound to liberate free hydrogen fluoride. A method of preparing such catalyst is described hereinafter in the examples. Charcoal is a particularly suitable sorption medium and is the preferred sorption medium to be used in treating unit 23. When the bottom fraction of azeotrope column 16 is treated to defluorinate the same, preferably the conditions of operation are such that the $C_4$ fluorides and lighter organic fluorides are removed from the effluent leaving the heavier organic fluorine compounds in the hydrocarbon stream. These heavier organic fluorine compounds pass through subsequent fractional distillations and are removed with the bottom fractions of the distillations as hereinafter described. By removing only the $C_4$ and lighter fluorides mild conditions of operation can be used in treating unit 23 with a saving of equipment and material, since the catalyst life is longer and regeneration of the sorbent is less frequent. There is also less tendency for chemical changes to occur in the organic mixture being treated to remove the organic fluorine compounds. In operating in this preferred manner, the organic fluorine content of the effluent from treating unit 23 is about 0.002 to about 0.001 per cent by weight of the resulting effluent. A portion of the effluent from treating unit 23 may be recycled through line 26 and in this way the fluorine content may be decreased even more. If preferred, however, all or a large portion of the organic fluorine compounds may be removed from the hydrocarbon stream by treating unit 23 alone, or in combination with a defluorination catalyst in azeotrope column 16.

As previously discused, the sorption medium may be regenerated and the hydrogen fluoride recovered therefrom by direct heating or by passing a hot gas, such as air, steam, butane, etc., through the sorption medium. In a preferred embodiment of the present invention, the sorption medium, such as charcoal, is regenerated by passing butane at a temperature between about 500 and about 600° F. through line 22 into treating unit 23 and withdrawing a resulting hydrogen fluoride-rich gas from the system through lines 24 and 27. The hydrogen fluoride may be separated from the butane in a conventional manner known in the art, such as by fractional distillation similar to that used to separate the hydrogen fluoride from the alkylation effluent of the present illustrated process. Since it is necessary to regenerate the sorption medium after a certain period of use, it will often be desirable to have several units for removing organic fluorine compounds in parallel so that while one unit is in process flow, another unit may be regenerated; thus, a continuous flow process is possible. If desired, therefore, treating unit 23 may comprise several units in parallel for removing organic fluorine compounds.

From treating unit 23 the resulting effluent passes through line 24 to fractionation system 28.

Fractionation system 28 may comprise a series of fractional distillation columns for the separation of the various components of the hydrocarbon effluent and is diagrammatically represented by element 28. In fractionation system 28 isobutane is separated and then passed through line 29 to be recycled to reactor 7 as a portion of the feed thereto. Propane and lighter hydrocarbons which are separated from the heavier hydrocarbons may be removed from system 28 through line 31. Normal butane which is also separated from other hydrocarbons is removed from fractionation system 28 through line 32. The normal butane may be recovered as a product or may be isomerized (not shown) to isobutane and passed to reactor 7 as a portion of the feed. A relatively high-boiling fraction from system 28 comprising the alkylate product is passed to another fractionating column for the separation of light alkylate from heavy alkylate. This high-boiling fraction from fractionation system 28 is thus passed through line 33 to fractionator 40. A light alkylate is removed from fractionator 40 through line 41 as a product of the process; while a heavier alkylate is removed through line 39 as a by-product.

When treating unit 23 and/or azeotrope column 16 is operated in such a manner that only the $C_4$ fluorides and lighter fluorides are removed from the hydrocarbon effluent, the bottom fraction from element 28 is passed through line 33 and line 34 to a treating unit 36 for the removal of the heavy organic fluorine compounds. Treating unit 36 is similar in arrangement of catalyst and sorption medium to treating unit 23 and is operated in a similar manner to unit 23, but under somewhat more severe conditions. Since the heavy fluorides have concentrated in the high-boiling fraction, the percentage of organic fluorine compounds in the hydrocarbon stream at this point in the process will be appreciably higher than before removal of the various lower-boiling fractions from the hydrocarbon effluent in fractionation system 28. However, after being treated in treater 36, the resulting hydrocarbon stream will usually contain not more than about 0.005 per cent by weight organic fluorine.

If the light alkylate product removed through line 41 contains appreciable amounts of organic fluorine compounds which have as yet not been removed by previous treating steps, this light alkylate may be freed of such organic fluorine compounds by passing the alkylate overhead through line 42 and treating unit 43 which is also similar to treating unit 23. The conditions of operation for treating unit 43 are also similar to those conditions of operation for treating unit 23. As a result of the treatment of the hydrocarbon stream, the light alkylate will contain not more than about 0.0006 to about 0.0005 per cent organic fluorine by weight.

Both treating units 36 and 43 may be regenerated by purging them with a hot gas as previously described, the hot gases being passed through the treating units 36 and 43 by means of lines 37 and 38, and lines 44, 42, and 45 respectively.

To prevent the build-up of excessive pressure in the alkylation system by the presence of propane and lighter hydrocarbons in the alkylation effluent, a small portion of these hydrocarbons may be vented from the system through line 19.

In the operation of such an alkylation system it is not necessary in all cases to have three treating units as shown in Figure 1, especially if a defluorination catalyst is present in azeotrope column 16. Treating unit 23 alone may be sufficient to remove the desired amount of organic fluorine compounds. On the other hand, in some cases treating unit 23 may be omitted and treating units 36 and 43 used instead. Where only a small amount of organic fluorine compounds is present in the hydrocarbon effluent from the alkylation reaction, and especially where these organic fluorine compounds are heavier than $C_4$ fluorides, it may be sufficient to provide a treating unit on line 42 for treating the light alkylate product without previous treatment of the hydrocarbon alkylation effluent. It is seen, therefore, that treating units may be located in various positions in the process, depending upon the requirements. The presence of a defluorination catalyst in column 16 may be sufficient alone to remove the desired quantity of organic fluorine compounds.

Figure 2:
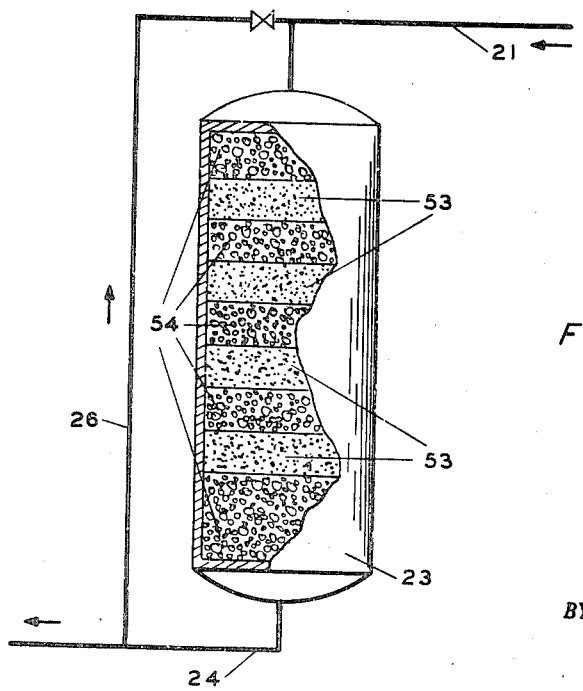

Figure 2 diagrammatically represents apparatus for an embodiment of treating unit 23, in which figure is shown alternate layers of defluorination catalyst and sorption medium. The hydrogen effluent enters treating unit 23 through line 21 and is removed through line 24. A portion of the resulting effluent may be recycled through line 26. Numeral 53 of Figure 2 designates successive layers of a defluorination catalyst, and numeral 54 designates successive layers of a sorption medium for sorbing and removing liberated hydrogen fluoride.

Figure 3 diagrammatically represents another arrangement of apparatus for treating unit 23 in which the defluorination catalyst and sorption medium are contained in separate columns. The hydrocarbon effluent passes through line 21 into column 71, which contains a defluorination catalyst designated by numeral 72. The treated hydrocarbon effluent is withdrawn from column 71 through line 73 and is introduced into a second column 74 which contains a sorption medium designated by numeral 76 for removing liberated hydrogen fluoride. The effluent from column 74 is removed by line 77 and a portion thereof may be recycled to column 71 through line 78. The effluent from column 74 is passed to column 79 which contains a defluorination catalyst, and the resulting effluent is removed therefrom through line 81. The effluent from column 79 is passed to column 82 which contains a sorption medium. The effluent from column 82 is removed by line 24 and a portion thereof may be recycled to column 79 through line 83. Any number of successive columns of defluorination catalyst and sorption medium may be used; the number of columns will depend upon the requirements necessary for removing the desired amount of organic fluorine compounds from the hydrocarbon effluent and upon the particular defluorination catalyst used. A portion of the resulting effluent from the treating unit represented in Figure 3 may be recycled from line 24 through line 26 to line 21.

The following examples illustrate the operability of the present invention and also show the effectiveness of the preferred defluorination catalysts for use in this invention.

*Example I*

300 grams of iron shavings were treated with concentrated sulfuric acid for 10 minutes; this treatment was followed by repeated decantation and water washing until the solution above the iron was only slightly acidic. The water was then drained off, and 250 ml. of a solution containing 0.20 gram of $CuSO_4 \cdot 5H_2O$ was added with vigorous shaking. After 5 minutes the solution was decanted, and the shavings were dried with two applications of acetone. Of the resulting catalyst, 185 cc. or 208.9 g. was divided into seven approximately equal parts that were placed in seven tubes. Charcoal was placed in eight similar tubes that were arranged alternately in series with the seven tubes of catalyst. The first charcoal tube was used to remove any free hydrogen fluoride from the feed. An acid-free hydrocarbon alkylation effluent comprising the bottom fraction of an azeotrope column of an alkylation process was passed, under sufficient pressure to maintain a liquid phase, through this arrangement of alternate tubes of catalyst and adsorption medium. The following results were obtained:

[Approximate temperature, 250° F. Liquid phase]

| Accumulated Time, hr. | Accumulated Volumes of Liq. Effluent | Space Velocity, Liq. Vol./vol. cat./hr. | Fluorine in Feed | | Organic Fluorine in Effluent, weight, Per Cent | Fluorine Removed, Per Cent |
|---|---|---|---|---|---|---|
| | | | Organic F, weight, Per Cent | Free HF, weight, Per Cent | | |
| 0 | 0 | | 0.0270 | 0.0000 | | |
| 19 | 42 | 2.2 | 0.0270 | 0.0000 | 0.0025 | 91 |
| 43 | 97 | 2.1 | 0.0270 | 0.0000 | 0.0005 | 98 |
| 63 | 154 | 2.2 | 0.0270 | 0.0000 | 0.0020 | 92 |

It will be noted that substantially complete removal of the organic fluorine was obtained, as indicated by the 91 to 98 per cent removal of organic fluorine compounds. As a matter of explanation, the primary purpose of the treatment of the iron with a concentrated acid prior to copper plated is to cleanse and etch the surface of the iron in preparation for copperplated. The etched surface also provides an increased contact area on the catalyst.

Example II

A similar catalyst to that of Example I was prepared except that 0.600 gram of $CuSO_4 \cdot 5H_2O$ was used in plating the iron. This material was placed in a small iron tube of 163 ml. capacity without the adsorption medium, and the following data were obtained with a part of the same feed as in Example I:

[Approximate temperature, 212° F. Liquid phase]

| Accumulated Time, hr. | Accumulated Volumes | Space Velocity, Liq. Vol./vol. cat./hr. | Fluorine in Feed | | Organic Fluorine in Effluent, weight, Per Cent | Fluorine Removed, Per Cent |
|---|---|---|---|---|---|---|
| | | | Organic F, weight, Per Cent | Free HF, weight, Per Cent | | |
| 0 | 0 | | 0.0270 | 0.0000 | | |
| 13 | 31 | 1.9 | 0.0270 | 0.0000 | 0.0063 | 77 |
| 61 | 151 | 2.4 | 0.0260 | 0.0000 | 0.0120 | 58 |
| 90 | 167 | 1.3 | 0.0260 | 0.0000 | 0.0130 | 50 |

Comparison of these results (percentage removal of fluorine) with those given under Example I indicates that advantageously increased removal of organic fluorine compounds is obtained by using the arrangement of alternate contacting of the hydrocarbon effluent with catalyst and with adsorption medium as in Example I than was obtained in the run described under Example II. It will be noted that as low as 50 per cent removal of organic fluorine compounds was obtained in Example II and the highest removal was only 77 per cent.

Example III

In another comparable run, iron shavings were treated with 10 per cent aqueous hydrogen chloride for 30 minutes, then washed with water and spread out to air-dry on absorbent paper for about 12 hours. The shavings thus treated were placed in a steel tube and were used to treat azeotrope tower bottoms from an alkylation process with the following results:

[Approximate temperature, 212° F. Liquid phase]

| Accumulated Time, hr. | Accumulated Volumes | Space Velocity, Liq. Vol./vol. cat./hr. | Fluorine in Feed | | Organic Fluorine in Effluent, weight, Per Cent | Fluorine Removed, Per Cent |
|---|---|---|---|---|---|---|
| | | | Organic F, weight, Per Cent | Free HF, weight, Per Cent | | |
| 18 | 11 | 0.6 | 0.0250 | 0.0000 | 0.0083 | 70 |
| 71 | 95 | 1.6 | 0.0280 | 0.0000 | 0.0131 | 53 |
| 90 | 125 | 1.7 | 0.0280 | 0.0000 | 0.0144 | 48 |
| 96 | 135 | 1.6 | 0.0280 | 0.0000 | 0.0170 | 39 |

Example III shows that a mixture of elementary metals is much superior to a single metal used alone as indicated by the increased amount of organic fluorine compounds removed by the copperplated catalyst of Example II. These results, like those given under Example II, also illustrate the relatively inefficient removal effected when an ordinary dehydrofluorination catalyst, such as iron, is used without the cooperating action of a hydrogen fluoride-sorption medium, as in Example II.

Example IV

In three different tests, substantially acid-free hydrocarbon effluent from a hydrofluoric acid alkylation unit was contacted with copper shavings, with nickel wire helices, and with Monel metal shavings (nickel-copper alloy). The temperature of the test was about 212° F. and the pressure was about 250 pounds per square inch gage, in all three tests. The superiority of Monel metal as a dehydrofluorination catalyst is clearly shown by the following data:

| Test | Catalyst | Space Velocity, vol. contacted/vol. cat./hr. | Duration of Run, hrs. | Organic F in Hydrocarbon, weight, Percent | | Flourine Removed Percent |
|---|---|---|---|---|---|---|
| | | | | Before Contacting | After Contacting | |
| 1 | Nickel helices | 1.30 | 98 | 0.0270 | 0.0225 | 16.7 |
| 2 | Copper shavings | 2.2 | 166 | 0.0260 | 0.0243 | 6.5 |
| 3 | Monel shavings | 1.74 | 158 | 0.0256 | 0.0131 | 48.8 |

Example V

In two additional tests similar to those described in Example IV, substantially acid-free hydrocarbon effluent from a hydrofluoric acid alkylation unit was contacted with iron shavings and with iron shavings previously plated with copper by immersion in a copper sulfate solution. The temperature of the test was about 212° F. and the pressure was about 250 pounds per square inch gage. The data obtained are given below. The data from test 2 in Example IV are repeated for comparison.

| Test | Catalyst | Space Velocity, vol. contacted/vol. cat./hr. | Duration of Run, hrs. | Organic F in Hydrocarbon, weight, Percent | | Flourine Removed Percent |
|---|---|---|---|---|---|---|
| | | | | Before Contacting | After Contacting | |
| 2 | Copper shavings | 2.2 | 166 | 0.0260 | 0.0243 | 6.5 |
| 4 | Iron shavings | 1.45 | 119 | 0.0276 | 0.0141 | 48.9 |
| 5 | Copper-plated iron shavings | 1.59 | 229 | 0.0261 | 0.0094 | 64.0 |

The above data clearly show the superiority of the polymetallic catalyst, namely, copper-plated iron, over either copper or iron alone. Furthermore, the life of the polymetallic catalyst is much longer than the normal life of either copper catalyst or the iron catalyst.

Example VI

Butane at atmospheric pressure and about 500° F. was passed through the tubes containing the adsorption medium to desorb and recover the hydrogen fluoride sorbed by the charcoal adsorption medium. The amount of hydrogen fluoride recovered was determined by passing the effluent gas through an alkali scrubbing solution, which was titrated with standard acid. The following data were obtained:

HF adsorbed _____ grams __ 2.14
HF recovered _____ do ____ 1.30
HF recovered _____ per cent _ 61

Part of the hydrogen fluoride was found to be held very firmly by the charcoal, but upon a second regeneration at a slightly higher temperature as much as 92% of the hydrogen fluoride was recovered from the same charcoal.

As a possible explanation for the superiority of the polymetallic catalysts, it is thought that same galvanic effect is set up on the surface of the catalyst or between the different metals, which effect renders the polymetallic catalysts particularly effective in accomplishing a quick decomposition of the organic fluorine compound. For example, copper alone, although useful as a defluorination catalyst, is not as effective for decomposition of the organic fluorine compounds as the copperplated iron catalyst. This inferior quality of copper alone is probably the result of the absence of such a galvanic effect. Other metals may be plated with another metal and as a result of which they act as superior defluorination catalysts for decomposing organic fluorine compounds in a similar manner as copperplated iron. Examples of other copperplated metal catalysts are tin, aluminum, magnesium, etc.

Although this invention has been described with reference to alkylation in particular, and the examples have used particular catalysts, it is evident that the invention in general may be used in connection with various other processes for the removal of fluorine compounds from a fluid mixture. Furthermore, various modifications of equipment, process of flow, and particular catalysts and the treatment thereof, may become obvious to those skilled in the art without departing from the scope of this invention.

I claim:

1. In a process for the alkylation of isobutane with an olefin in the presence of a hydrofluoric acid alkylation catalyst wherein organic fluorine compounds are formed as by-products of said alkylation and contaminate a hydrocarbon alkylation effluent, the method for removing said organic fluorine compounds which comprises separating said hydrocarbon alkylation effluent into a liquid hydrocarbon-rich phase and a liquid hydrofluoric acid-rich phase, passing said hydrocarbon-rich phase containing dissolved hydrofluoric acid and minor proportions of organic fluorine compounds to a fractional distillation and separating therein a relatively low-boiling fraction comprising substantially all of said dissolved hydrofluoric acid and a relatively high-boiling fraction containing organic fluorine compounds, passing said high-boiling fraction to a treating zone for removal of organic fluorine compounds from said fraction, said treating zone comprising alternate layers of a polymetallic defluorination catalyst and a hydrogen fluoride-sorption medium, said polymetallic defluorination catalyst comprising a solid mixture of a plurality of elementary metals, maintaining a temperature between about 200 and about 300° F. and a pressure between about 200 and about 450 pounds per square inch gage in said treating zone, maintaining a space velocity in liquid volumes of the high-boiling fraction passing through said treating zone per volume of catalyst per hour between about 2 and about 3, and removing a resulting effluent substantially free from fluorine compounds from said treating zone.

2. In a process for the alkylation of a low-boiling isoparaffin with an olefin in the presence of a hydrofluoric acid alkylation catalyst wherein organic fluorine compounds are formed as by-products of said alkylation and contaminate a hydrocarbon alkylation effluent, the method for removing said organic fluorine compounds which comprises separating said hydrocarbon alkylation effluent into a liquid hydrocarbon-rich phase and a liquid hydrofluoric acid-rich phase, passing said hydrocarbon-rich phase containing dissolved hydrofluoric acid and minor proportions of organic fluorine compounds to a fractional distillation and separating therein a relatively low-boiling fraction comprising substantially all of said dissolved hydrofluoric acid and a relatively high-boiling fraction containing organic fluorine compounds, and subjecting said high-boiling fraction to the action of a polymetallic defluorination catalyst comprising a solid mixture of a plurality of elementary metals under conditions such that decomposition of said organically combined fluorine is effected without effecting extensive chemical changes in said high-boiling fraction.

3. A process for treating a hydrocarbon material to remove organically combined fluorine therefrom, which comprises subjecting a hydrocarbon material containing a minor proportion of organically combined fluorine to the action of a polymetallic defluorination catalyst comprising a solid mixture of a plurality of metals which is active under the conditions of treatment in effecting decomposition of organically combined fluorine without effecting extensive chemical changes in said hydrocarbon material, maintaining said hydrocarbon material at a temperature between about 70 and about 400° F. and at a pressure between about 100 and about 600 pounds per square inch gage during contact with said catalyst, maintaining a space velocity in liquid volumes of hydrocarbon material per volume of catalyst per hour between about 1 and about 10, removing hydrogen fluoride liberated as a result of contact between said catalyst and hydrocarbon material from a resulting effluent, and recovering a hydrocarbon material substantially free from organically combined fluorine.

4. A process for treating a hydrocarbon material to remove organically combined fluorine therefrom, which comprises subjecting a hydrocarbon material containing a minor proportion of organically combined fluorine to the action of a polymetallic defluorination catalyst comprising a solid mixture of a plurality of metals which is active under the conditions of treatment in effecting decomposition of organically combined fluorine without effecting extensive chemical changes in said hydrocarbon material, maintaining said hydrocarbon material at a temperature between about 70 and about 400° F. and at a pressure between about 100 and about 600 pounds per square inch gage during contact with said catalyst, and maintaining a space velocity in liquid volumes of hydrocarbon material per volume of catalyst per hour between about 1 and about 10.

5. A process for treating a hydrocarbon material to remove organically combined fluorine therefrom, which comprises subjecting a hydrocarbon material containing a minor proportion of organically combined fluorine to the action of a polymetallic defluorination catalyst comprising a solid mixture of a plurality of metals which is active under the conditions of treatment in effecting decomposition of organically combined fluorine without effecting extensive chemical changes in said hydrocarbon material.

6. A process for treating an organic material to remove organically combined fluorine therefrom, which comprises subjecting an organic material containing organically combined fluorine to the action of a solid polymetallic mixture of a plurality of elementary metals active under the conditions of treatment in effecting decomposition of organically combined fluorine without effecting extensive chemical changes in said organic material, removing hydrogen fluoride liberated as a result of contact between said catalyst and organic material from a resulting effluent, and recovering a material substantially free from organically combined fluorine.

7. The process of claim 6 in which said solid polymetallic mixture comprises a metal plated with another metal.

8. The process of claim 6 in which said solid polymetallic mixture comprises a metal plated with copper.

9. The process of claim 6 in which said polymetallic mixture comprises a solid solution.

10. The process of claim 6 in which said polymetallic mixture comprises Monel metal.

11. A process for treating an organic material to remove organically combined fluorine therefrom, which comprises subjecting an organic material containing organically combined fluorine to the action of a solid polymetallic non-homogeneous mixture of a plurality of elementary metals which is active under the conditions of treatment in effecting decomposition of organically combined fluorine without effecting extensive chemical changes in said organic material, removing hydrogen fluoride liberated as a result of contact between said catalyst and organic material from a resulting effluent, and recovering a material substantially free from organically combined fluorine.

12. The process of claim 11 in which solid polymetallic mixture comprises a mixture of a finely divided metal with another finely divided metal.

13. The process of claim 12 in which said polymetallic mixture comprises a piece of iron and a piece of copper.

14. A process for treating an organic material to remove organically combined fluorine therefrom, which comprises subjecting an organic material containing organically combined fluorine to the action of a plurality of bodies of a defluorinating catalyst comprising a solid polymetallic mixture of elementary metals active in effecting decomposition of organically combined fluorine without effecting extensive chemical changes in said organic material, removing hydrogen fluoride liberated as a result of contact between said catalyst and organic material from a resulting effluent, and recovering a material substantially free from organically combined fluorine.

15. A process for treating an organic material to remove organically combined fluorine therefrom, which comprises subjecting an organic material containing organically combined fluorine to the action of a plurality of bodies of a defluorinating catalyst comprising a solid ploymetallic mixture of elementary metals active in effecting decomposition of organically combined fluorine without effecting extensive chemical changes in said organic material, removing hydrogen fluoride liberated as a result of contact between said catalyst and organic material by contacting the resulting effluent with a plurality of bodies of hydrogen fluoride sorption material, and recovering a material substantially free from organically combined fluorine.

16. A process according to claim 15 wherein said bodies of defluorinating catalyst and sorption material are arranged alternately.

17. A process according to claim 15 wherein said bodies of catalyst and sorption material are a plurality of alternate layers of from 3 to 6 inches in depth within a defluorination zone.

JACK F. EBERLE.

REFERENCES CITED

The following references are of record in the file of this patent:

UNITED STATES PATENTS

| Number | Name | Date |
| --- | --- | --- |
| 1,869,781 | Shiffler et al. | Aug. 2, 1932 |
| 2,066,697 | Seguy | Jan. 5, 1937 |
| 2,333,648 | Grosse et al. | Nov. 9, 1943 |
| 2,333,649 | Grosse et al. | Nov. 9, 1943 |
| 2,347,945 | Frey | May 2, 1944 |
| 2,351,167 | Ware | June 13, 1944 |
| 2,377,546 | Frey | June 5, 1945 |
| 2,378,636 | Iverson | June 19, 1945 |
| 2,396,844 | Grosse et al. | Mar. 19, 1946 |
| 2,413,868 | Frey | Jan. 7, 1947 |

FOREIGN PATENTS

| Number | Country | Date |
| --- | --- | --- |
| 315,818 | Great Britain | Apr. 10, 1930 |

Certificate of Correction

Patent No. 2,481,208 September 6, 1949

JACK F. EBERLE

It is hereby certified that errors appear in the printed specification of the above numbered patent requiring correction as follows:

Column 1, line 24, for the words "more effected" read *are effected*; column 2, line 52, for "ffuorine" read *fluorine*; column 7, line 14, for "catalystic" read *catalytic*; column 10, line 48, for "discused" read *discussed*; column 18, line 2, for "pluraity" read *plurality*; line 27, after "said" insert *solid*; line 49, for the claim reference numeral "12" read *11*;

and that the said Letters Patent should be read with these corrections therein that the same may conform to the record of the case in the Patent Office.

Signed and sealed this 11th day of April, A. D. 1950.

[SEAL]

THOMAS F. MURPHY,
*Assistant Commissioner of Patents.*